US009062619B2

(12) United States Patent
Murakami et al.

(10) Patent No.: US 9,062,619 B2
(45) Date of Patent: Jun. 23, 2015

(54) ENGINE CONTROL DEVICE FOR TRACTOR (75) Inventors: Tatsuzo Murakami, Ehime (JP);
Takanori Izutani, Ehime (JP);
Tomoyuki Ishida, Ehime (JP); Takashi Wakino, Ehime (JP); Yutaka Kajino, Ehime (JP)

(73) Assignee: ISEKI & CO., LTD., Matsuyama-shi (JP)

( * ) Notice: Subject to any disclaimer, the term of this patent is extended or adjusted under 35 U.S.C. 154(b) by 0 days.

(21) Appl. No.: 13/574,153

(22) PCT Filed: Jan. 19, 2011

(86) PCT No.: PCT/JP2011/050831
§ 371 (c)(1),
(2), (4) Date: Jul. 19, 2012

(87) PCT Pub. No.: WO2011/090058
PCT Pub. Date: Jul. 28, 2011

(65) Prior Publication Data
US 2012/0296532 A1 Nov. 22, 2012

(30) Foreign Application Priority Data
Jan. 19, 2010 (JP) .................................. 2010-009368

(51) Int. Cl.
*F02D 41/30* (2006.01)
*F02D 31/00* (2006.01)
*F02D 29/00* (2006.01)

(52) U.S. Cl.
CPC ...... *F02D 31/001* (2013.01); *F02D 2200/0604* (2013.01); *F02D 29/00* (2013.01)

(58) Field of Classification Search
USPC ........................................................ 701/50
See application file for complete search history.

(56) References Cited

U.S. PATENT DOCUMENTS

| 6,199,018 | B1 * | 3/2001 | Quist et al. ...................... 702/34 |
| 7,458,917 | B2 * | 12/2008 | Yoshikawa et al. ........... 477/115 |
| 7,954,556 | B2 * | 6/2011 | Hou et al. ......................... 172/7 |
| 8,364,363 | B2 * | 1/2013 | Nakamura et al. .............. 701/68 |
| 8,626,407 | B2 * | 1/2014 | Fujimoto ......................... 701/50 |
| 2008/0053669 | A1 * | 3/2008 | Hou et al. ......................... 172/3 |
| 2009/0314563 | A1 * | 12/2009 | Burkholder .............. 180/65.265 |

(Continued)

FOREIGN PATENT DOCUMENTS

AU 8659736 * 2/1987
DE 4037248 * 5/1992

(Continued)

OTHER PUBLICATIONS

International Search Report Issued Mar. 29, 2011 in PCT/JP11/50831 Filed Jan. 19, 2011.

*Primary Examiner* — John R Olszewski
*Assistant Examiner* — Jean-Paul Cass
(74) *Attorney, Agent, or Firm* — Oblon, McClelland, Maier & Neustadt, L.L.P.

(57) ABSTRACT

In structure of an engine control device for a tractor, when a standard engine performance curve is selected by a mode selection device, and a PTO drive device, which drives an implement attached to a tractor, is turned on, switching to the engine speed maintenance control mode is performed. Further, when a fuel efficient engine performance curve is selected by the mode selection device, and the PTO drive device, which drives the implement, is turned on, switching to the engine speed change control mode is performed. The problem that an engine stall tends to occur when control for maintaining the engine speed is performed while the fuel efficient engine performance curve with lower consumption rate than normal consumption rate is selected can be solved.

3 Claims, 7 Drawing Sheets

(56) References Cited

U.S. PATENT DOCUMENTS

| | | | |
|---|---|---|---|
| 2010/0145581 A1* | 6/2010 | Hou | 701/50 |
| 2012/0296532 A1* | 11/2012 | Murakami et al. | 701/50 |
| 2013/0000295 A1* | 1/2013 | Bissontz | 60/409 |

FOREIGN PATENT DOCUMENTS

| | | | |
|---|---|---|---|
| EP | 320117 | * | 6/1989 |
| EP | 711678 | * | 5/1996 |
| EP | 1040956 A1 | * | 10/2000 |
| EP | 1172248 | * | 1/2002 |
| JP | 10141485 | * | 5/1998 |
| JP | 10 159599 | | 6/1998 |
| JP | 10184877 | * | 7/1998 |
| JP | 2007 231848 | | 9/2007 |
| JP | 2009 156190 | | 7/2009 |
| WO | WO8201853 | * | 6/1982 |

* cited by examiner

ENGINE CONTROL DEVICE FOR TRACTOR

FIELD

The present invention relates to an engine control device for a tractor, which operates such that, in the tractor, the output of the engine is controlled in a fuel efficient engine performance curve for reduced fuel consumption and in a standard engine performance curve for normal fuel consumption.

BACKGROUND

A work vehicle such as a construction machine is designed to run or work in an energy-saving output mode in which the fuel consumption rate is lower than a normal fuel consumption rate.

For example, Patent Literature 1 discloses an engine control method for a construction machine, in which fuel consumption is improved by switching engine control to a fuel efficient mode specification, that is, an energy-saving output mode, by a mode selection device.

CITATION LIST

Patent Literature

Patent Literature 1: Japanese Laid-open Patent Publication No. 2007-231848

SUMMARY

Technical Problem

Where an energy-saving output mode in which the fuel consumption rate is lower than a normal fuel consumption rate is selected, since the energy-saving output mode is lower than a standard output mode in terms of maximum permissible load, the possibility of reaching the maximum permissible load is high. Therefore, when control for maintaining the engine speed is performed, the engine may stall immediately when reaching the maximum permissible load in the energy-saving output mode.

Solution to Problem

To achieve the object by solving the foregoing problem, the invention described in claim 1 provides an engine control device for a tractor. The tractor comprises: a mode selection device (134) configured to switch between a standard engine performance curve (N) to obtain predetermined output and a fuel efficient engine performance curve (S) to reduce fuel consumption than that in the standard engine performance curve (N); and an engine speed maintenance control mode (B) in which when load is applied, an engine speed is maintained at a preset speed, and an engine speed change control mode (A) in which when load is applied, the engine speed is controlled to decrease, and the engine control device is configured to control the tractor such that switching to the engine speed maintenance control mode (B) is performed when the standard engine performance curve (N) is selected by the mode selection device (134), and a PTO drive device (151), which drives an implement attached to the tractor, is turned on, and the engine control device is configured to control the tractor such that switching to the engine speed change control mode (A) is performed when the fuel efficient engine performance curve (S) is selected by the mode selection device (134), and the PTO drive device (151), is turned on.

In the engine control device for the tractor, when work is undertaken while the standard engine performance curve (N) is selected by the mode selection device (134), and the PTO drive device (151) is turned on, the engine speed control is performed in the engine speed maintenance control mode (B) automatically. When a determination is made that there is a margin in the engine load, the fuel efficient engine performance curve (S) is selected by the mode selection device (134). In response to this selection, automatic switching to the engine speed change control mode (A) is performed.

In the engine control device for the tractor, when work is undertaken while the fuel efficient engine performance curve (S) is selected by the mode selection device (134), and the PTO drive device (151) is turned on, the engine speed control is performed in the engine speed change control mode (A) automatically. When a determination is made that there is no margin in the engine load, the standard engine performance curve (N) is selected by the mode selection device (134). In response to this selection, automatic switching to the engine speed maintenance control mode (B) is performed.

In the invention described in claim 2, the tractor further comprises: an engine speed storage device (152) configured to store the engine speed; and an engine speed reproduction device (153) configured to reproduce the engine speed stored in the engine speed storage device (152), and the engine control device is configured to control the tractor such that switching to the engine speed change control mode (A) is performed when the fuel efficient engine performance curve (S) is selected by the mode selection device (134), and the engine speed reproduction device (153) is turned on.

In the engine control device for the tractor, the engine speed storage device (152) stores the engine speed. The engine speed reproduction device (153) reproduces the engine speed stored in the engine speed storage device (152). When cultivation work, traction work, or the like, is undertaken, the engine speed stored in the engine speed reproduction device (153) is reproduced as mentioned above. By reproducing the stored engine speed and selecting the fuel efficient engine performance curve (S) by the mode selection device (134), automatic switching to the engine speed change control mode (A) is performed.

In the invention described in claim 3, the tractor further comprises a manual switch (150), and the engine control device is configured to control the tractor such that switching to the engine speed maintenance control mode (B) always is performed when the manual switch (150) is turned on.

In the engine control device for the tractor, when the manual switch (150) is turned on, switching to the engine speed maintenance control mode (B) always is performed.

Advantageous Effects of Invention

According to the invention described in claim 1, automatic switching to the engine speed change control mode (A) is performed when the fuel efficient engine performance curve (S) is selected by the mode selection device (134) and the PTO drive device (151) for driving an implement is turned on. This yields the effects described below.

That is, since the maximum permissible load for the fuel efficient engine performance curve (S) is lower than that for the standard engine performance curve (N), a possibility of reaching the maximum permissible load is high. Therefore, this may lead to the problem that where work is undertaken in the engine speed maintenance control mode (B) with the fuel efficient engine performance curve (S) selected, the engine may immediately stall when reaching the maximum permissible load.

However, when the work is undertaken using the fuel efficient engine performance curve (S) in the engine speed change control mode (A), the engine speed decreases in proportion to the strength of the load, thereby preventing the problem that the engine speed immediately leads to stalling or the engine's having to be restarted. Additionally, according to the load, the engine speed decreases, making it easier for an operator to notice the load state.

In addition, automatic switching to the engine speed maintenance control mode (B) is performed when the standard engine performance curve (N) is selected by the mode selection device (134) and the PTO drive device (151) for driving the implement is turned on. Accordingly, since work can be undertaken at a constant speed until the maximum permissible engine load is reached, engine capacity can be utilized to the maximum and work efficiency thus improved.

According to the invention described in claim 2, when the engine speed reproduction device (153) is turned on, work is basically undertaken. Accordingly, switching to the engine speed change control mode (A) is performed when the fuel efficient engine performance curve (S) is selected by the mode selection device (134) and the engine speed reproduction device (153) is turned on. Therefore, the invention described in claim 2 has effects similar to those in claim 1.

That is, since the maximum permissible load for the fuel efficient engine performance curve (S) is lower than that for the standard engine performance curve (N), a possibility of reaching the maximum permissible load is high. Therefore, this may lead to the problem that where work is undertaken in the engine speed maintenance control mode (B) with the fuel efficient engine performance curve (S) selected, the engine may immediately stall when the curve (S) reaches the maximum permissible load.

However, by undertaking work using the fuel efficient engine performance curve (S) in the engine speed change control mode (A), the engine speed decreases in proportion to the strength of the load, thereby preventing the problem that the engine speed immediately leads to stalling or the engine's having to be restarted. Additionally, in proportion to the strength of the load the engine speed decreases, making it easier for an operator to notice the load state.

According to the invention described in claim 3, when the manual switch (150) is turned on, switching to the engine speed maintenance control mode (B) is always performed, thus enabling more efficient work and running.

DESCRIPTION OF EMBODIMENTS

The invention will be described in detail below with reference to the drawings. It should be understood that the present invention is not limited to the embodiments below. It should also be understood that the compositional elements in the embodiments below include ones that could easily be anticipated by those skilled in the art and ones that are substantially identical to the compositional elements, that is, ones that fall in the range of so-called equivalents. Additionally, the compositional elements in the embodiments below may be combined as required.

Figure 1:
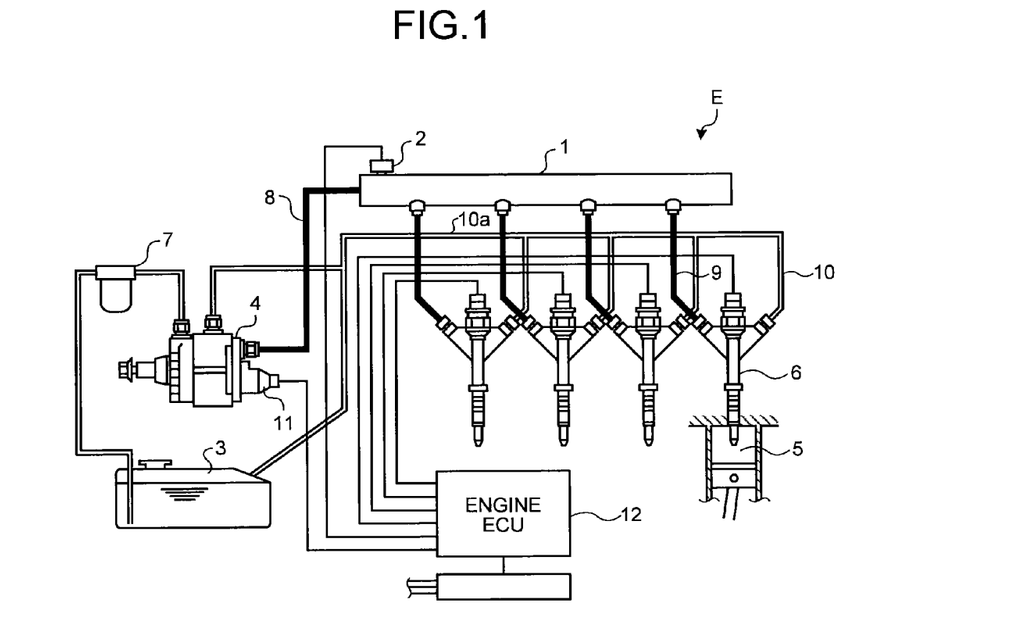
FIG. 1 is a diagram of the entire configuration of a fuel injection system of pressure accumulation type.

FIG. 1 is a diagram of the entire configuration of a fuel injection system of pressure accumulator type. A fuel injection system of pressure accumulator type is used in, for example, a multi-cylinder diesel engine but may be one used in a gasoline engine. The fuel injection system of pressure accumulator type includes, for example: a common rail 1 that accumulates the pressure of fuel to injection pressure by which the fuel is appropriately controlled; a rail pressure sensor 2 attached to this common rail 1; a high-pressure fuel pump 4 that pressurizes fuel forced to flow from a fuel tank 3, and feeds the fuel to the common rail 1 under pressure; high-pressure injectors 6 by which the high-pressure fuel accumulated in the common rail 1 is injected into a cylinder 5 of an engine E; a control device (an engine ECU 12) that controls operations, such as the control of the high-pressure fuel pump 4, high-pressure injectors 6, and so on.

As described above, the common rail 1 is used to adjust fuel to be injected into each cylinder 5 of the engine E, to pressure required for output demanded. Fuel in the fuel tank 3 is sucked into the high-pressure fuel pump 4, driven by the engine E, through an intake passage via a fuel filter 7. The high-pressure fuel obtained through pressurization by the high-pressure fuel pump 4 is guided to the common rail 1 through a discharge passage 8 and stored in this rail 1.

High-pressure fuel in the common rail 1 is supplied to the high-pressure injectors 6 for the cylinders through corresponding high-pressure fuel supply passages 9. Based on a command from the engine control device (ECU) 12, the high-pressure injectors 6 are actuated. Consequently, the high-pressure fuel is injected and supplied to the chamber of each cylinder 5 of the engine E. A surplus of fuel (i.e., return fuel) in each high-pressure injector 6 is guided to a common return passage 10a through a corresponding return passage 10, and is returned to the fuel tank 3 through this return passage 10a.

The high-pressure fuel pump 4 is provided with a pressure control valve 11 in order to control fuel pressure in the common rail 1 (common-rail pressure). In response to a signal from the engine ECU 12, this pressure control valve 11 adjusts the flow area of the passage 10a through which a surplus of fuel is returned to the fuel tank 3 from the high-pressure fuel pump 4. Thereby, the amount of fuel supplied to the common rail 1 is adjusted and the common-rail pressure can be controlled.

Specifically, a target common-rail pressure is set according to conditions for operating the engine E, and the common-rail pressure detected by the rail pressure sensor 2 is feed-back controlled via the pressure control valve 11 so that this common-rail pressure equals a target common-rail pressure.

Figure 2:
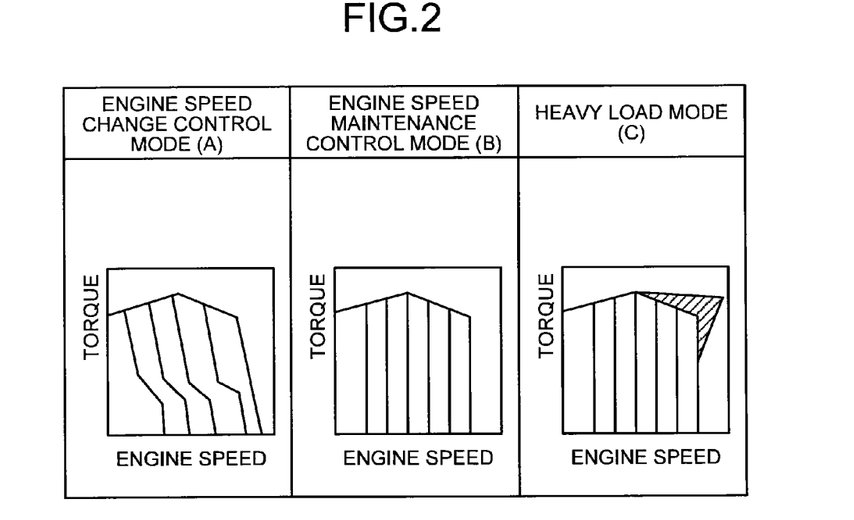
FIG. 2 is a diagram comparing engine speed control modes.

The engine ECU 12 of a diesel engine E with a common rail 1 in agricultural machines such as a tractor has three types of control mode, which are engine speed change control mode A (droop control mode A), engine speed maintenance control mode B (isochronous control mode B, and heavy load C, all relating to engine speed and output torque, as shown in FIG. 2.

The engine speed change control mode A is configured such that the output changes in response to a change in the engine speed. Basically, the mode A is used when a vehicle is traveling. In order to prevent sudden engine stall, this mode is used even during work. For example, during the vehicle is traveling, when the vehicle is decelerated or stopped by braking, the engine speed decreases with the increase in running load. This mode enables the vehicle to decelerate or stop safely. In addition, when a workload is applied during the vehicle works, the engine speed is caused to decrease according to the load.

The engine speed maintenance control mode B is a control for maintaining the engine speed constant even when a load increases. Basically, this mode is used during work. For example, according to this mode, where a tractor cultivating is subject to resistance applied to one of its cultivating blades due to soil hardness, or where a combine harvesting is subject to load increase, the engine speed can be maintained.

The heavy load mode C is a control in which a heavy load control for increasing the output by increasing the engine speed when it becomes near the load limit is added to the control for maintaining the engine speed constant regardless of load change as in the engine speed maintenance control mode B. In particular, this mode is used where work is undertaken near the load limit. For example, where a tractor cultivating encounters hard arable soil, the engine performance may increase beyond the normal limit. Even in such a case, this mode enhances the work efficiency without interrupting the work.

Figure 3A:
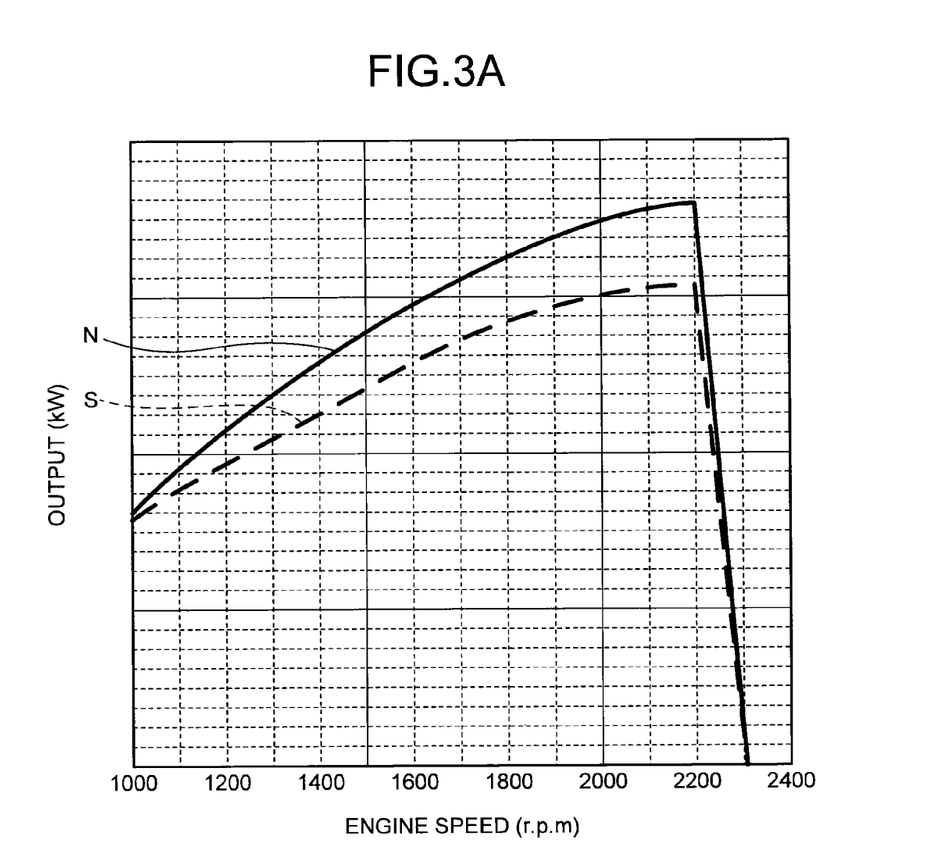
FIG. 3A is a diagram illustrating the relation between the engine speed and output, and indicating the output characteristics of the engine E.

FIG. 3A is a diagram illustrating the relation between the engine speed and the output, and indicating the output characteristics of the engine E. Each of a fuel efficient engine performance curve S and a standard engine performance curve N indicates the relation between the engine speed (rpm) and output (kW).

The fuel efficient engine performance curve S indicates a control in which the amount of fuel supplied is decreased compared to the rate of fuel consumption indicated by the standard engine performance curve N. Accordingly, in the overall rotation area, the output indicated by the fuel efficient engine performance curve S is about 10% lower than that indicated by the standard engine performance curve N.

Figure 3B:
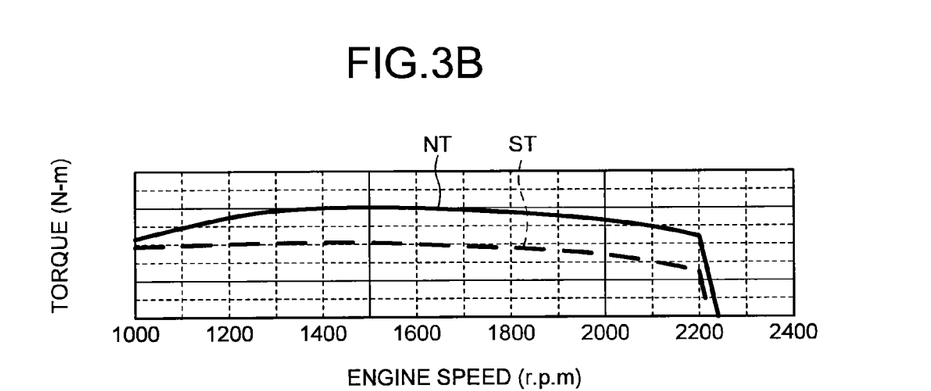
FIG. 3B is a diagram illustrating the relation between the engine speed and torque, and indicating the output characteristics of the engine E.

FIG. 3B is a diagram illustrating the relation between the engine speed and the torque, which indicates the output characteristics of the engine E. Symbol ST indicates the relation between the engine speed (rpm) and the torque (N•m) in the fuel efficient engine performance curve S, and symbol NT indicates the relation between the engine speed (rpm) and the torque (N•m) in the standard engine performance curve N.

Figure 6:
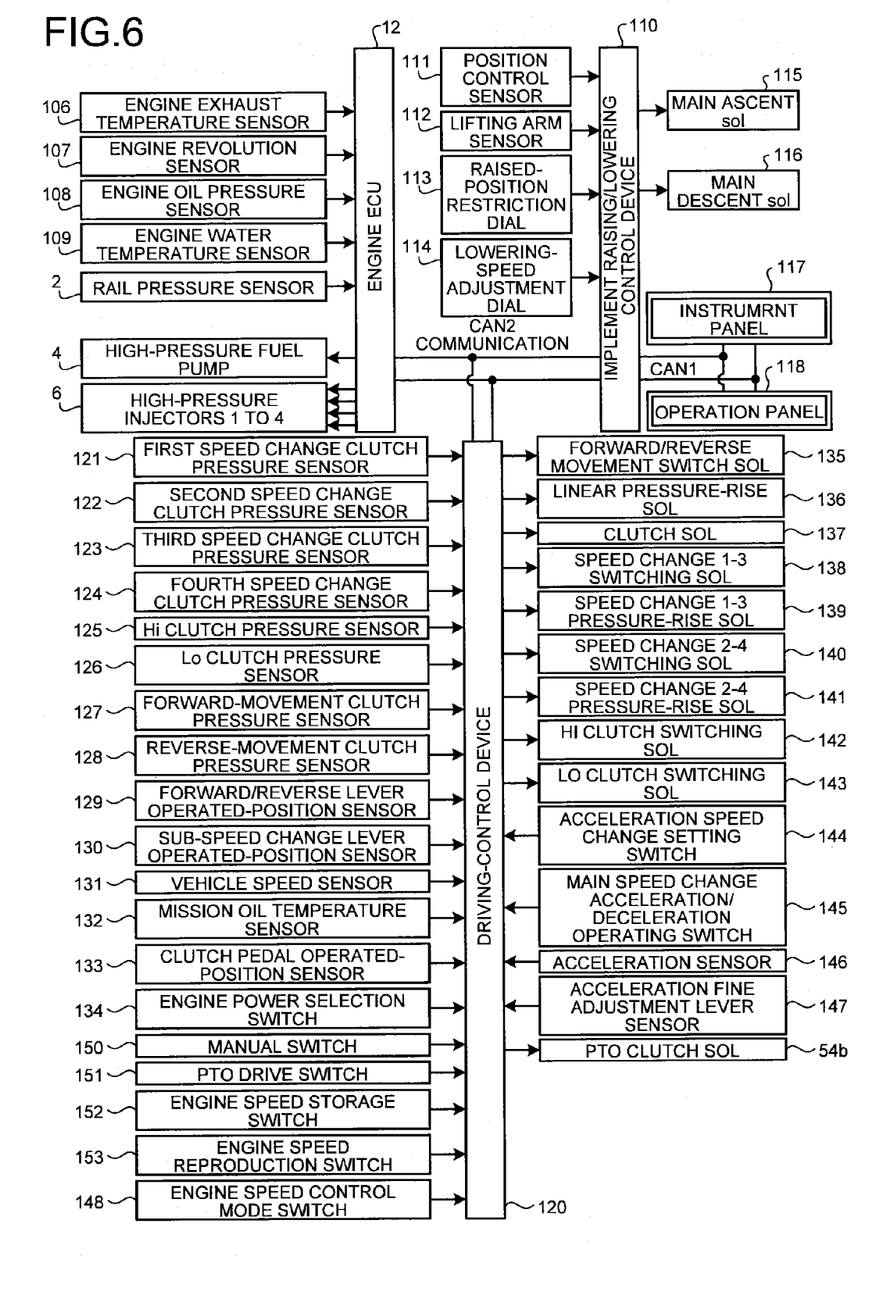
FIG. 6 is a control block diagram.
Figure 9:
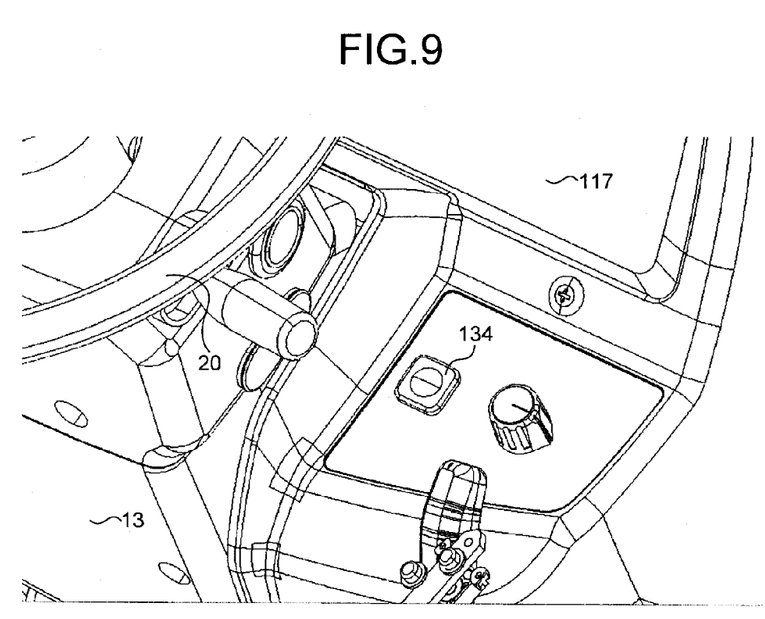
FIG. 9 is an enlarged perspective view of the vicinity of the right side of a steering handle.

Use of the engine E by switching between the fuel efficient engine performance curve S and the standard output curve N, is set by operating a mode selection device (hereafter referred to as an engine power selection switch) 134. FIGS. 6 and 9 show the engine power selection switch.

When the tractor drives, automatic switching to the engine speed change control mode A is performed. Then, by selecting the standard engine performance curve N by the engine power selection switch 134 and also turning on a PTO drive device (hereafter referred to as a PTO drive switch) 151 for driving any implement attached to the tractor, automatic switching to the engine speed maintenance control mode B is performed. In the PTO drive device, the operation of a lever or the like may be detected by using, for example, a switch.

By selecting the fuel efficient output curve S by the engine power selection switch 134 and also turning on the PTO drive switch 151 for driving the implement, automatic switching to the engine speed change control mode A is performed.

During work while the PTO drive switch 151 is turned on and the standard engine performance curve N is selected by the engine power selection switch 134, the engine speed is automatically controlled in the engine speed maintenance control mode B. If a determination is made that there is a margin in the engine load, the fuel efficient engine performance curve S is selected by the mode selection device 134. As a result of this selection, automatic switching to the engine speed change control mode A is performed.

During work while the PTO drive switch 151 is turned on and the fuel efficient engine performance curve S is selected by the engine power selection switch 134, the engine speed is automatically controlled in the engine speed change control mode A. If a determination is made that there is no margin in the engine load, the standard engine performance curve N is selected by the engine power selection switch 134. As a result of this selection, automatic switching to the engine speed maintenance control mode B is performed.

Since the maximum permissible load of the fuel efficient engine performance curve S is lower than that of the standard engine performance curve N, the output curve S has a higher possibility of reaching the maximum permissible load than the output curve N. Therefore, where the fuel efficient engine performance curve S, for example, is selected, trouble may occur in that when it reaches the maximum permissible load during work in the engine speed maintaining mode B, the engine may immediately stall.

To avoid this, work is carried out on the fuel efficient engine performance curve S and in the engine speed change control mode A. Consequently the engine speed decreases according to the load, thus enabling avoidance of the engine speed's possibly leading to immediate stalling or any necessity to restart the engine. Additionally, the engine speed decreases according to the load, thus making it easier for an operator to notice a status of the load.

When the standard engine performance curve N is selected by the engine power selection switch 134 and also the PTO drive switch 151 for driving the implement is turned on, automatic switching to the engine speed maintenance control mode B is performed. This makes it possible for the tractor to work with a constant engine speed up to the maximum permissible load of the engine itself. Engine capacity can be utilized to the maximum, hence improving work efficiency.

Figure 5:
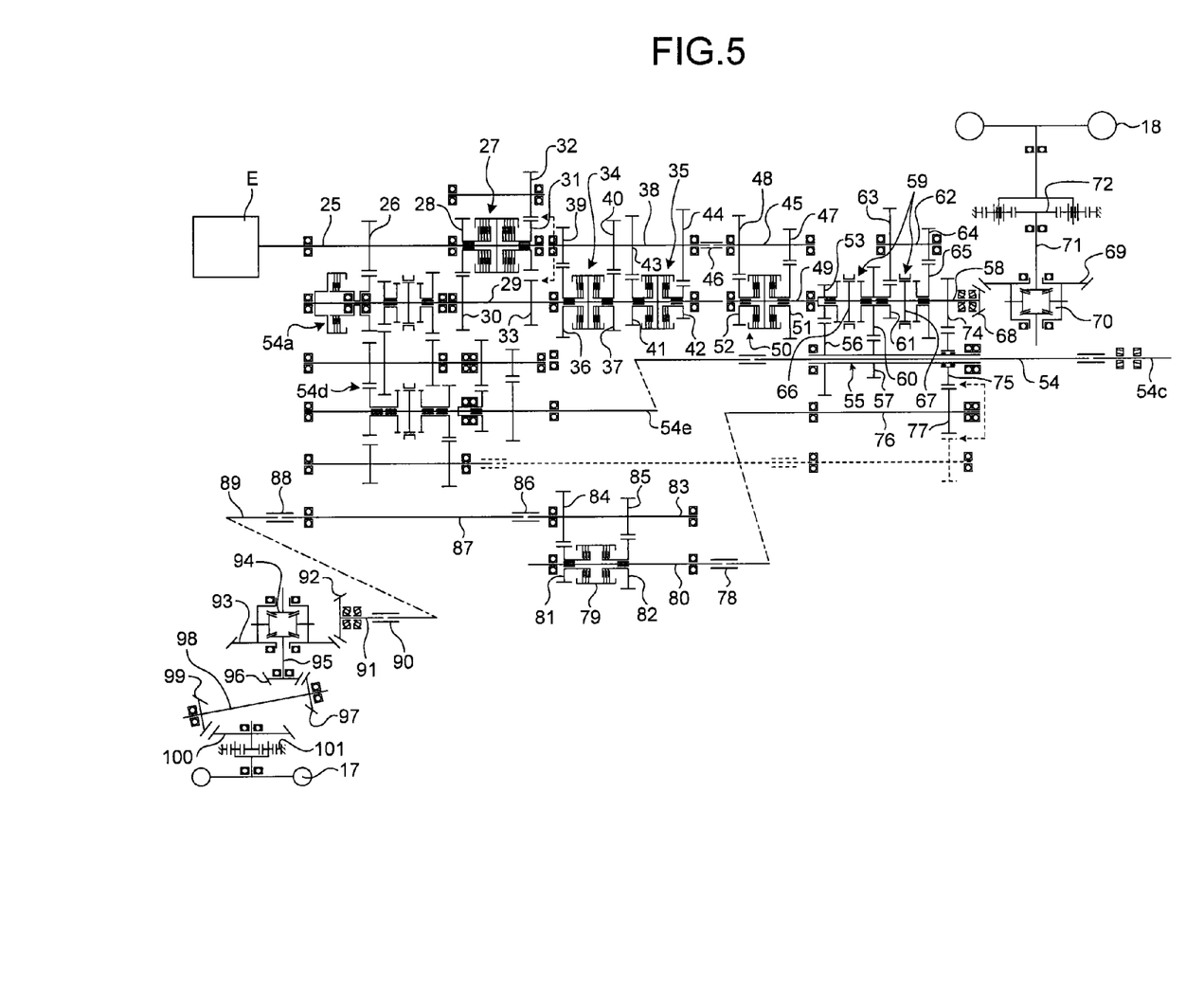
FIG. 5 is a diagram illustrating the power transmission mechanism of a transmission device in a mission case.

When the PTO drive switch 151 is turned on, a PTO clutch sol (solenoid) 54b, shown in FIG. 6 and described below, is supplied with power and a PTO clutch 54a, shown in FIG. 5, is turned on.

As shown in FIG. 6, the engine control device includes: an engine speed storage device (hereafter referred to as engine speed storage switch) 152, which stores a specific engine speed; and an engine speed reproduction device (hereafter referred to as an engine speed reproduction switch) 153, which reproduces the stored specific engine speed. This engine speed reproduction switch 153 enables automatic setting of the specific engine speed. Accordingly, any need to operate an acceleration lever, etc., is eliminated and operability is improved.

When the fuel efficient engine performance curve S is selected by the engine power selection switch 134 and also the engine speed reproduction switch 153 is turned on, automatic switching to the engine speed change control mode A is performed.

Using the engine speed storage switch 152, an operator stores a desired specific engine speed into a running-control device 120. Then, the stored engine speed is reproduced by operating the engine speed reproduction switch 153. When work is undertaken, the stored specific engine speed is reproduced with the engine speed reproduction switch 153 in such a manner. When the stored engine speed is reproduced and the fuel efficient engine performance curve S is selected by the engine power selection switch 134, automatic switching to the engine speed change control mode A is performed.

As described above, by reproducing the stored engine speed and selecting the fuel efficient engine performance curve S by the engine power selection switch 134 while working, automatic switching to the engine speed change control mode A is performed. Accordingly, the engine speed decreases according to the load, thus enabling avoidance of the engine speed's possibly leading to immediate stalling and the engine's having to be restarted. The engine speed decreases according to the load, thus making it easier for an operator to notice a status of the load.

In another configuration, the load rate of a PTO output shaft 54c (FIG. 5) driving the implement is detected, and where the vehicle is working or driving with about 70% or less of the highest output of the standard engine performance curve N for a fixed length of time, automatic switching to the fuel efficient engine performance curve S is performed. This enables efficient, fuel efficient work and running. The load rate of the PTO output shaft 54c is calculated from the current engine speed with respect to a predetermined engine speed.

Conversely where the vehicle is working or driving with about 70% or more of the highest output of the fuel efficient engine performance curve S for a fixed length of time, automatic switching to the standard engine performance curve N is performed. Thus, by utilizing the engine's own capacity, the vehicle can work and drive.

Where a range shift lever (not shown) is shifted to an on-street driving position (a position indicating a high speed driving at a high speed change position) or the vehicle is driving with the standard engine performance curve N for a fixed length of time (about 10 min), automatic switching to the fuel efficient engine performance curve S may be performed.

With regard to the engine speed change control mode A, the engine speed maintenance control mode B, and the heavy load mode C, automatic switching to the engine speed maintenance control mode B may be performed in response to, for example, a speed change operation with the range shiftlever of an agricultural vehicle (e.g., a tractor, a combine harvester, or a seedling transplanter) or in response to an on-off switching operation of a task clutch (i.e., a PTO clutch for rotary cultivator drive or the like in a tractor, or the drive clutch of a reaping part or threshing part in a combine harvester). Incidentally, there is a case where, even when the PTO clutch is turned off in the tractor, a lift arm connecting an implement may be raised and lowered while the lifting arm is located lower than its uppermost position. In such a case, since plowing or plow-soiling is being performed, the engine speed maintenance control mode B or heavy load mode C is used automatically.

Manual switching among the engine speed change control mode A, engine speed maintenance control mode B, and heavy load mode C may be performed by operating an engine speed control mode switch 148 (FIG. 6). In the case of a manual operation, selection is determined by an operator.

Shifting a sub-speed change shift lever to an on-street driving position causes automatic switching to the engine speed change control mode A. However, a load is small in case of on-street driving. Therefore, automatic switching to the fuel efficient engine performance curve S may be performed. In this case, when the sub-speed change shift lever is operated to a position other than the on-street driving position, a return to the standard engine performance curve N is performed if this standard engine performance curve N has been selected in advance. Thus, the efficient driving is possible.

When the engine power selection switch 134 is turned on, the engine speed change control mode A may always be used. Also, when the engine power selection switch 134 is turned off and the transmission is automatically performed by an operation of an accelerator pedal, the engine speed change control mode A may be used.

When the engine power selection switch 134 and a manual switch 150 (FIG. 6) are turned off and, furthermore, the PTO clutch is turned on, the engine speed maintenance control mode B may be used automatically. Instead of the condition that this PTO clutch is turned on, the condition that an implement is in a lowered position or that the engine speed reproduction switch 153 is turned on may be used. When the PTO clutch is turned off, the implement is raised, or the engine speed reproduction switch 153 is turned off, automatic switching to the engine speed change control mode A may be performed.

When the manual switch 150 is turned on, the engine speed maintenance control mode B is always used. This enables efficient work and driving.

Figure 4:
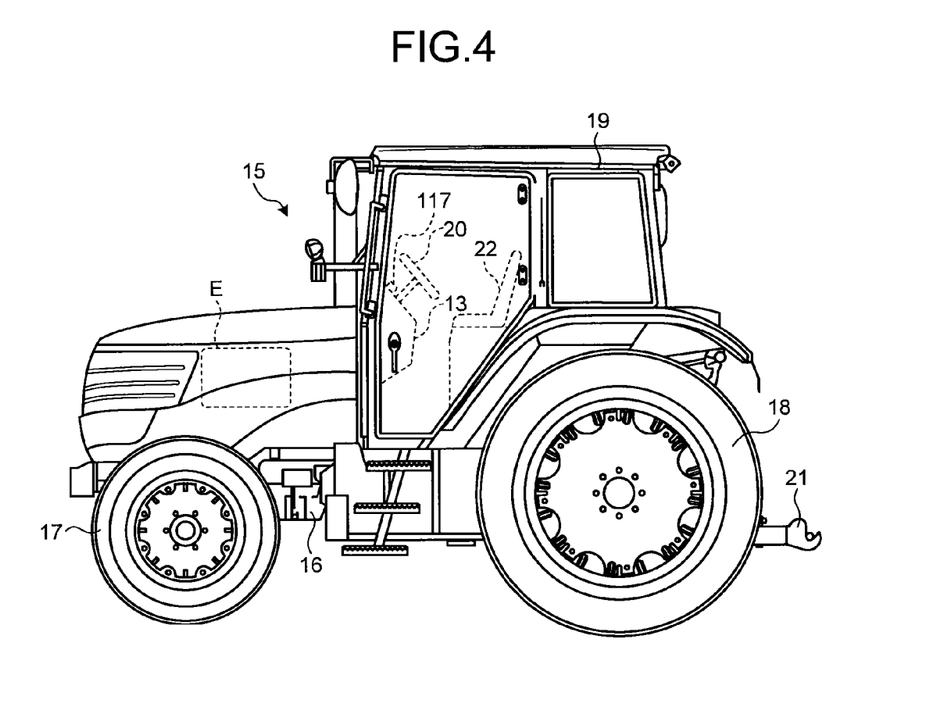
FIG. 4 is a side view of the entire tractor.

FIG. 4 illustrates a tractor 15 as one example of a work vehicle in which the present invention is applied.

The tractor 15 has an engine E in the hood of the forward region of a vehicle body. The rotating power of the engine E is transmitted to a speed change device in a transmission case 16, and rotating power decelerated by the speed change device is transmitted to front wheels 17 and rear wheels 18. An operator's seat 22 on the vehicle body is enclosed in a cabin 19. A steering wheel 20 extends upward from a dashboard 13 provided with an instrument panel 117, which is located in front of the operator's seat in the cabin 19. Disposed around the steering wheel 20 is a lever for forward/backward movement, a parking brake lever, a PTO selector lever, etc. This engine E is a diesel engine of common rail type, mentioned above.

An implement such as a rotary cultivator is attached by providing a hitch 21 and three-point linkage (not shown) between the left and right rear wheels 18 and 18.

Figure 7:
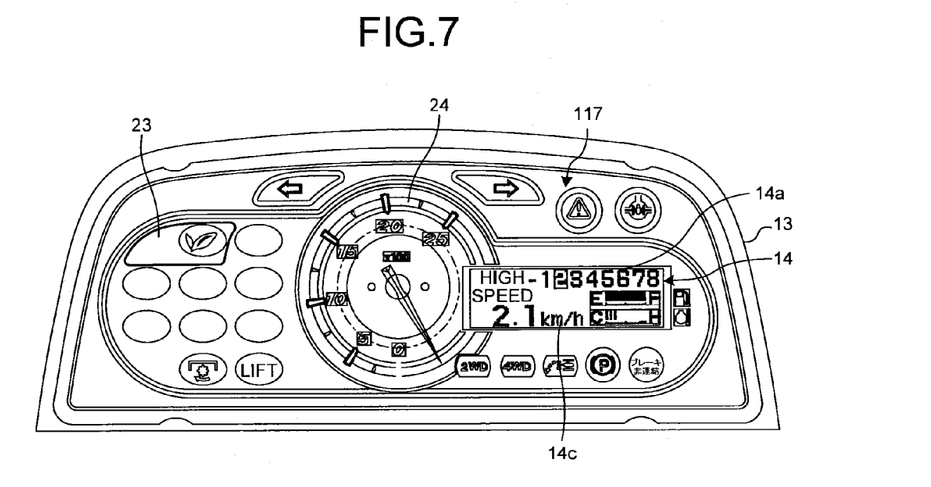
FIG. 7 is an enlarged view of a meter panel.
Figure 8:
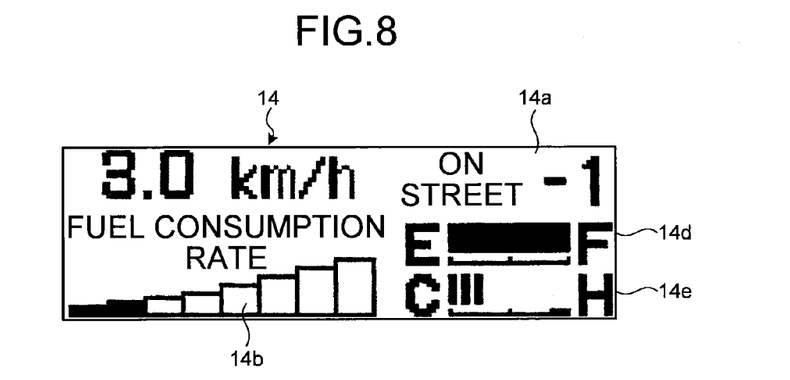
FIG. 8 is an enlarged view of a data display.

FIG. 7 is an enlarged view of an instrument panel 117. FIG. 8 is an enlarged view of a liquid crystal data display part 14 in the instrument panel 117 and illustrates a display example. FIG. 9 is an enlarged perspective view of the vicinity of the right side of the steering wheel 20 extending upward from the dashboard 13.

An engine tachometer 24 is disposed in the center of the instrument panel 117 in front of the steering wheel 20, the liquid crystal data display part 14 is disposed on the right side of the tachometer 24, and an energy-saving monitor lamp 23 is disposed on the left side of the tachometer 24.

The data display part 14 includes a gear speed display 14a for displaying current gear speed, a fuel consumption rate display 14b, and so on. The fuel consumption rate display 14b changes with a driving speed display 14c after fixed periods of time. The fuel consumption rate is the proportion of the amount of fuel actually injected to achieve maximum output in relation to the engine speed at the time. The data display part 14 displays a fuel gauge 14d and an engine cooling water temperature gauge 14e as well.

The energy-saving monitor lamp 23 lights up when the fuel efficient engine performance curve S has been selected by the engine power selection switch 134. It lights up in green.

As shown in FIG. 9, the engine power selection switch 134 is provided on the right side of the steering wheel 20 and on the dashboard 13. By depressing this engine power selection switch 134, the engine is controlled with the fuel efficient engine performance curve S.

FIG. 5 is a diagram of a speed change mechanism for the speed change device in the transmission case 16. A configuration for transmission of power from the engine E to the front wheels 17 and rear wheels 18 will now be described.

To an input shaft 25 directly connected to the output shaft of the engine E, a first gear 26 is fixed and a forward/backward movement switching clutch 27 is fastened.

One of the gears of the forward/backward movement switching clutch 27, namely a second gear 28, engages with a third gear 30, which is fixed to a first speed change shaft 29, thereby causing deceleration. The other one of the gears of the forward/backward movement switching clutch 27, namely a fourth gear 31, engages via a counter gear 32 with a fifth gear 33, which is fixed to the first speed change shaft 29, thereby transmitting power while rotating in the reverse direction. Specifically, when the forward/backward movement switching clutch 27 is coupled to the second gear 28, the rotation of the input shaft 25 is transmitted to the first speed change shaft 29 such that the shaft 29 rotates in the reverse direction. When the clutch 27 is coupled to the fourth gear 31, the rotation of the input shaft 25 is transmitted to the first speed change shaft 29 such that the shaft 29 rotates in the normal direction. The neutral state in which the clutch 27 is separated from both the second and fourth gears 28 and 31 is the main clutch off-state in which power is not transmitted. By controlling a hydraulic valve, this main clutch off-state can be held. That is, the forward/backward movement switching clutch 27, activated when automatic control is exerted, when the forward/-reverse lever is operated, or when the clutch pedal is operated, functions as the main clutch.

To the first speed change shaft 29 downstream of the forward/backward movement switching clutch 27 in the transmission, a first speed change clutch 34 for switching to first speed/third speed and a second speed change clutch 35 for switching to a second speed/fourth speed are attached.

The first clutch gear 36 and a second clutch gear 37 of the first speed change clutch 34 for switching to first speed/third speed engage with a third clutch gear 39 and a fourth clutch gear 40, respectively, which are fixed to a second counter shaft 38. The rotation of the first speed change shaft 29 is transmitted to the second counter shaft 38 by switching to the first or third speed.

A fifth clutch gear 41 and a sixth clutch gear 42 of the second transmission clutch 35 for switching to a second speed/fourth speed engage with a seventh clutch gear 43 and an eighth clutch gear 44, respectively, which are fixed to the second counter shaft 38. The rotation of the first speed change shaft 29 is transmitted to the second counter shaft 38 by switching to the second or fourth speed.

Downstream of the second counter shaft 38 in the transmission is a third counter shaft 45 connected by a coupling 46 such that power is transmitted directly. A small gear 47 and a large gear 48 are fixed to this third counter shaft 45. The small gear 47 and large gear 48 engage with a large clutch gear 51 and small clutch gear 52 of a high/low speed switching clutch 50, which is attached to a second speed change shaft 49, thereby transmitting rotation of the third counter shaft 45 to the second speed change shaft 49 at high or low speed.

A sixth gear 53 is fixed to the downstream end of the second speed change shaft 49 in the transmission. This sixth gear 53 engages with a large gear 56 of a large-and-small gear section 55, which is rotatably supported on a third drive shaft 54, thereby transmitting power while decelerating.

A small gear 57 of the large-and-small gear section 55 engages with a seventh gear 60 of two sub-speed change clutches 59, which are pivotally supported on a bevel gear shaft 58, thereby transmitting power while decelerating. Additionally, an eighth gear 61 provided integrally with the seventh gear 60 engages with a second large gear 63, which is fixed to a fifth counter shaft 62, thereby transmitting power while decelerating.

To the fifth counter shaft 62, a second small gear 64 is also attached. This second small gear 64 engages with a third large gear 65 on the bevel gear shaft 58, thereby transmitting power while decelerating. Accordingly, while decelerating, rotation of the second speed change shaft 49 is transmitted from the sixth gear 53, through the large gear 56, the small gear 57, the seventh gear 60, the eighth gear 61, the second large gear 63, and the second small gear 64, to the third large gear 65.

A first shifter 66 and a second shifter 67 of the two corresponding sub-speed change clutches 59 operated by a sub-speed change shift lever engage with the bevel gear shaft 58 so as to able to slide in the axial direction of the shaft 58. When the first shifter 66 is slid to and engaged with the seventh gear 60, rotation of the seventh gear 60 is transmitted to the bevel gear shaft 58. When the second shifter 67 is slid to and engaged with the eighth gear 61, rotation of the eighth gear 61 is transmitted to the bevel gear shaft 58, and is gradually decelerated. Consequently, the bevel gear shaft 58 is rotated at low speed.

The rotation of the bevel gear shaft 58 is transmitted to a differential gear 70 through a first bevel gear 68 and a second bevel gear 69, and is transmitted from the differential gear 70 to the rear wheels 18 through a vehicle shaft 71 and a planetary gear 72.

The foregoing may be summarized as follows: rotation of the input shaft 25 is first switched to normal rotation or reverse rotation by the forward/backward movement switching clutch 27; normal or reverse rotation is changed in speed to four levels, i.e., from first to fourth speeds, by the first transmission clutch 34 for switching to first speed/third speed and by the second transmission clutch 35 for switching to second speed/fourth speed; the resultant rotation is changed in speed to two levels, i.e., low and high speeds, by the high/low speed switching clutch 50, and is further changed in speed to three levels, i.e., high, medium, and low speeds, by the two sub-speed change clutches 59; and rotation of the input shaft 25, thus changed in speed, is transmitted to the bevel gear shaft 58. That is, rotation of the input shaft 25 is changed in speed to 24 levels (4×2×3) and transmitted to the vehicle shaft 71.

Driving force is transmitted to the front wheels 17 in the manner described below. A ninth gear 74 is fixed to the bevel gear shaft 58, which ninth gear 74 is engaged with a relay gear 75, and the relay gear 75 is engaged with a tenth gear 77, which is fixed to a third drive shaft 76, thereby driving this third drive shaft 76. Using a second coupling 78, the third drive shaft 76 is connected to a speed change shaft 80 to which a front-wheel acceleration clutch 79 is attached. An eleventh gear 81 and twelfth gear 82 of the front-wheel acceleration clutch 79 are engaged with a thirteenth gear 84 and a fourteenth gear 85, respectively, which are fixed to a seventh counter shaft 83, thereby switching to front-wheel acceleration from regular front-wheel drive. Incidentally, by shifting the front-wheel acceleration clutch 79 to neutral, drive of the front wheels 17 is discontinued and only the rear wheels are driven.

Using a third coupling 86, the seventh counter shaft 83 is connected to a front-wheel drive shaft 87. Further, using a fourth coupling 88, a extension shaft 89, and a fifth coupling 90, the front-wheel drive shaft 87 is connected to a front-wheel drive bevel shaft 91.

Power from the front-wheel drive bevel shaft 91 drives the front wheels 17 by its being transmitted through a first front bevel gear 92, a second front bevel gear 93, a front differential gear 94, a front differential gear 95, a third front bevel gear 96, a fourth front bevel gear 97, a vertical shaft 98, a fifth front bevel gear 99, a sixth front bevel gear 100, and a planetary gear 101 in that order.

A PTO output shaft 54c is connected to the downstream side of the third drive shaft 54 in the transmission. The PTO output shaft 54c is driven through a PTO speed change device 54d, a PTO counter shaft 54e, and this third drive shaft 54.

Next, control flow is explained with reference to a control block diagram in FIG. 6.

First, the engine ECU (engine control device) 12 receives the following input: exhaust temperature from an engine exhaust temperature sensor 106, engine speed from an engine revolution sensor 107, engine lubricating oil pressure from an engine oil pressure sensor 108, cooling water temperature from an engine water temperature sensor 109, and pressure of common rail 1 from a rail pressure sensor 2. A drive signal is output to the high-pressure fuel pump 4, and a fuel supply adjustment control signal is output to the high-pressure injector 6.

Next, an implement raising/lowering control device 110 receives the following inputs: an operation signal from a position control sensor 111 provided for an implement raising/lowering lever, an ascent/descent signal from a lifting arm sensor 112, raised-position restriction signal from a raised-position restriction dial 113, and a lowering-speed set signal from a lowering-speed adjustment dial 114. An implement raising/lowering signal is output to main raising and lowering solenoids 115 and 116, respectively, thereby activating an implement raising/lowering cylinder.

Control signals are exchanged (CAN 1 and CAN 2 communications) among the engine ECU 12, the implement raising/lowering control device 110, and the driving-control device 120 described below, thereby displaying on an instrument panel 117 whether the engine E uses the normal engine performance curve N or fuel efficient engine performance curve S, the raised/lowered state of the implement, driving speed of the driving device, and so on, also displaying on an operation panel 118 the current positions of each lever and pedal, and so on.

The driving-control device 120 receives the inputs of clutch turn-on signals from first, second, third, and fourth speed change clutch pressure sensors 121, 122, 123, and 124, that is, the gear speeds of a multi-gear speed change device. Specifically, signals from the first speed change clutch 34 for switching to first speed/third speed and from the second speed change clutch 35 for switching to second speed/fourth speed. The driving-control device 120 also receives input from the transmission position of a sub-clutch from a Hi (High speed) clutch pressure sensor 125 and a Lo (Low speed) clutch pressure sensor 126. That is, it receives a signal from the high/low speed switching clutch 50.

The driving-control device 120 receives inputs regarding forward/neutral/backward movement of the main clutch from a forward-movement clutch pressure sensor 127 and a backward-movement clutch pressure sensor 128. That is, it receives a signal from the forward/backward movement switching clutch 27. The running-control device 120 also receives inputs regarding transmission operation positional signals from a forward/-reverse lever operated-position sensor 129, which detects the position of a forward/reverse-lever used to move the tractor forward/backward, and from a sub-speed change shift lever operated-position sensor 130, which detects the operated position of a sub-transmission lever.

The driving-control device 120 receives the following inputs: driving speed from a vehicle speed sensor 131, mission oil temperature from a mission oil temperature sensor 132, a clutch pedal depression signal from a clutch pedal-depression sensor 133, a selection signal for the standard engine performance curve N or fuel efficient engine performance curve S from the engine power selection switch 134, and an engine control mode switching signal from the engine speed control mode switch 148. The device 120 also receives an on/off signal from the manual switch 150.

Furthermore, the driving control device 120 receives the following inputs: a signal from an acceleration speed change setting switch 144, which carries out automatic transmission for the vehicle when driving (on a street) with the foot throttle pedal depressed, an operation signal from a main speed change acceleration/deceleration operating switch 145, which carries out acceleration or deceleration in manual speed change, an acceleration operation signal from an acceleration sensor 146, which detects the position of an hand throttle lever, and an acceleration adjustment signal from an acceleration fine adjustment lever sensor 147, which finely adjusts acceleration.

With regard to output from the driving control device 120, a switching signal from a forward/backward movement switching clutch is output to a forward/backward movement switch sol (solenoid) 135; a relief pressure adjustment signal for oil pressure, which drives the forward/backward switching sol (solenoid), is output to a linear pressure-rise sol (solenoid) 136, thereby reducing clutch connection shock; and an on/off signal is output to a clutch sol (solenoid) 137.

Additionally, a first or second speed input signal is output to a transmission 1-3 switching sol (solenoid) 138 of a hydraulic cylinder, which drives the first transmission clutch 34 for switching to first or third speed, and a relief pressure adjustment signal for oil pressure, which drives the first transmission clutch 34 for switching to first or third speed, is output to the transmission 1-3 pressure-rise sol (solenoid) 139, thereby reducing clutch connection shock. A second or fourth speed input signal is output to a transmission 2-4 switching sol (solenoid) 140 of a hydraulic cylinder, which drives the second speed change clutch 35 for switching to second or fourth speed, and a relief pressure adjustment signal for oil pressure, which drives the second speed change clutch 35 for switching to second or fourth speed, is output to the transmission 2-4 pressure-rise sol (solenoid) 141, thereby reducing clutch connection shock. A high-speed clutch on-signal and a low-speed clutch on-signal are respectively output to a Hi (High speed) clutch switching sol (solenoid) 142 and a Lo (Low speed) clutch switching sol (solenoid) 143, which activate a hydraulic cylinder for driving a high/low speed switching clutch 50.

REFERENCE SIGNS LIST

A ENGINE SPEED CHANGE CONTROL MODE
B ENGINE SPEED MAINTENANCE CONTROL MODE
E ENGINE
N NORMAL ENGINE PERFORMANCE CURVE

S FUEL EFFICIENT ENGINE PERFORMANCE CURVE
134 MODE SELECTION DEVICE (ENGINE POWER SELECTION SWITCH)
150 MANUAL SWITCH
151 PTO DRIVE DEVICE (PTO DRIVE SWITCH)
152 ENGINE SPEED STORAGE DEVICE (ENGINE SPEED STORAGE SWITCH)
153 ENGINE SPEED REPRODUCTION DEVICE (ENGINE SPEED REPRODUCTION SWITCH)

The invention claimed is:

1. An engine control device for a tractor, the tractor comprising:
a mode selection device configured to switch between a standard engine performance curve to obtain predetermined output and a fuel efficient engine performance curve to reduce fuel consumption than that in the standard engine performance curve; and
an engine speed maintenance control mode in which when load is applied, an engine speed is maintained at a preset speed, and an engine speed change control mode in which when load is applied, the engine speed is controlled to decrease, and
wherein the engine control device is configured to control the tractor such that automatic switching to the engine speed maintenance control mode is performed when the standard engine performance curve is selected by the mode selection device, and a PTO drive device, which drives an implement attached to the tractor, is turned on to rotate a PTO output shaft, and when a determination is made that there is a margin in engine load, the fuel efficient engine performance curve is selected by the mode selection device and automatic switching to the engine speed change control mode is performed, and
wherein the engine control device is configured to control the tractor such that automatic switching to the engine speed change control mode is performed when the fuel efficient engine performance curve is selected by the mode selection device, and the PTO drive device, which drives the implement, is turned on to rotate the PTO output shaft, and when a determination is made that there is no margin in the engine load, the standard engine performance curve is selected by the mode selection device and automatic switching to the engine speed maintenance control mode is performed,
wherein the engine control device is configured to control the tractor such that switching to the engine speed maintenance control mode is performed in a case that the implement is located lower than an uppermost position of the implement and a lift arm is raised and lowered even when the PTO drive device is turned off to not rotate the PTO output shaft, and
wherein a sub-transmission-lever is configured to be shifted to one of an on-street running position and a position other than the on-street running position, and when the sub-transmission-lever is shifted to the on-street running position, automatic switching to the engine speed change control mode and the fuel efficient engine performance curve is performed.

2. The engine control device for the tractor according to claim 1, wherein the engine control device is configured to control the tractor such that switching to the engine speed maintenance control mode is performed in a case that plowing is performed in which the implement is located lower than an uppermost position of the implement and a lift arm is raised and lowered even when the PTO drive device is turned off to not rotate the PTO output shaft,
the tractor further comprising:
an engine speed storage device configured to store the engine speed; and
an engine speed reproduction device configured to reproduce the engine speed stored in the engine speed storage device, and
wherein the engine control device is configured to control the tractor such that switching to the engine speed change control mode is performed when the fuel efficient engine performance curve is selected by the mode selection device, and the engine speed reproduction device is turned on.

3. The engine control device for the tractor according to claim 2, the tractor further comprising a manual switch, and
wherein the engine control device is configured to control the tractor such that switching to the engine speed maintenance control mode always is performed when the manual switch is turned on.

* * * * *